UNITED STATES PATENT OFFICE.

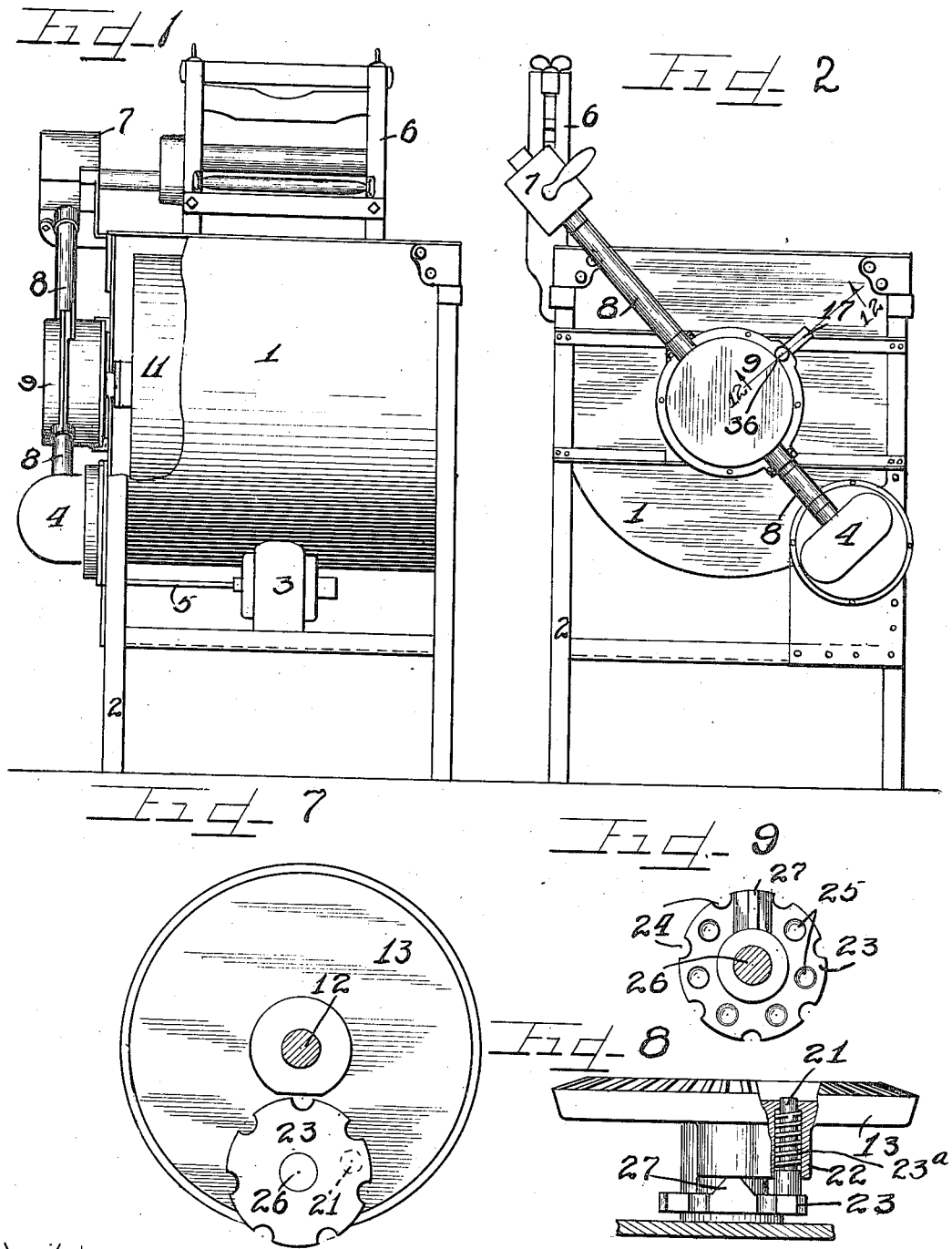

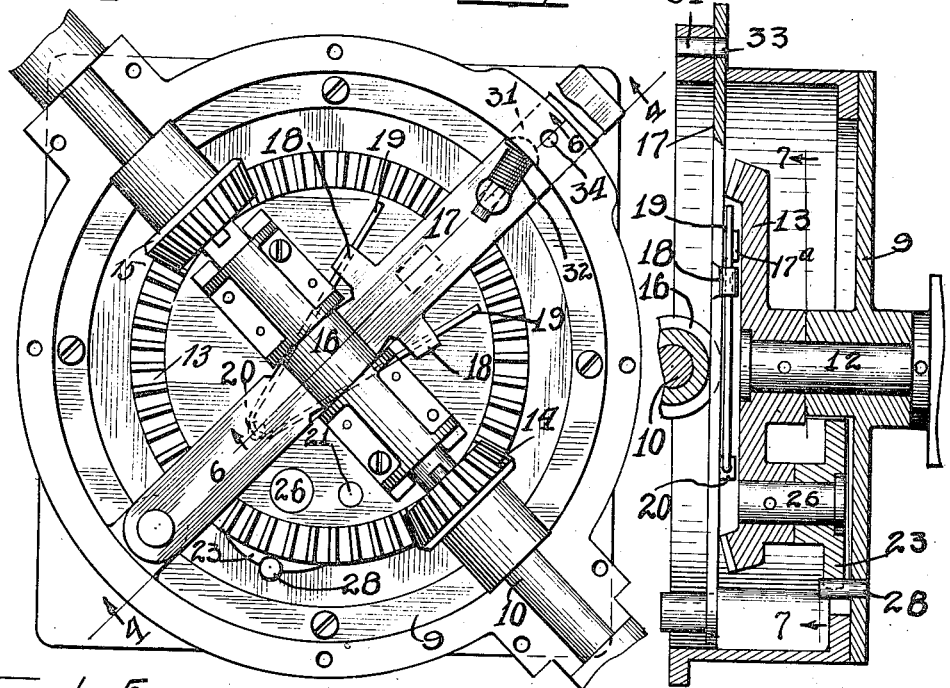

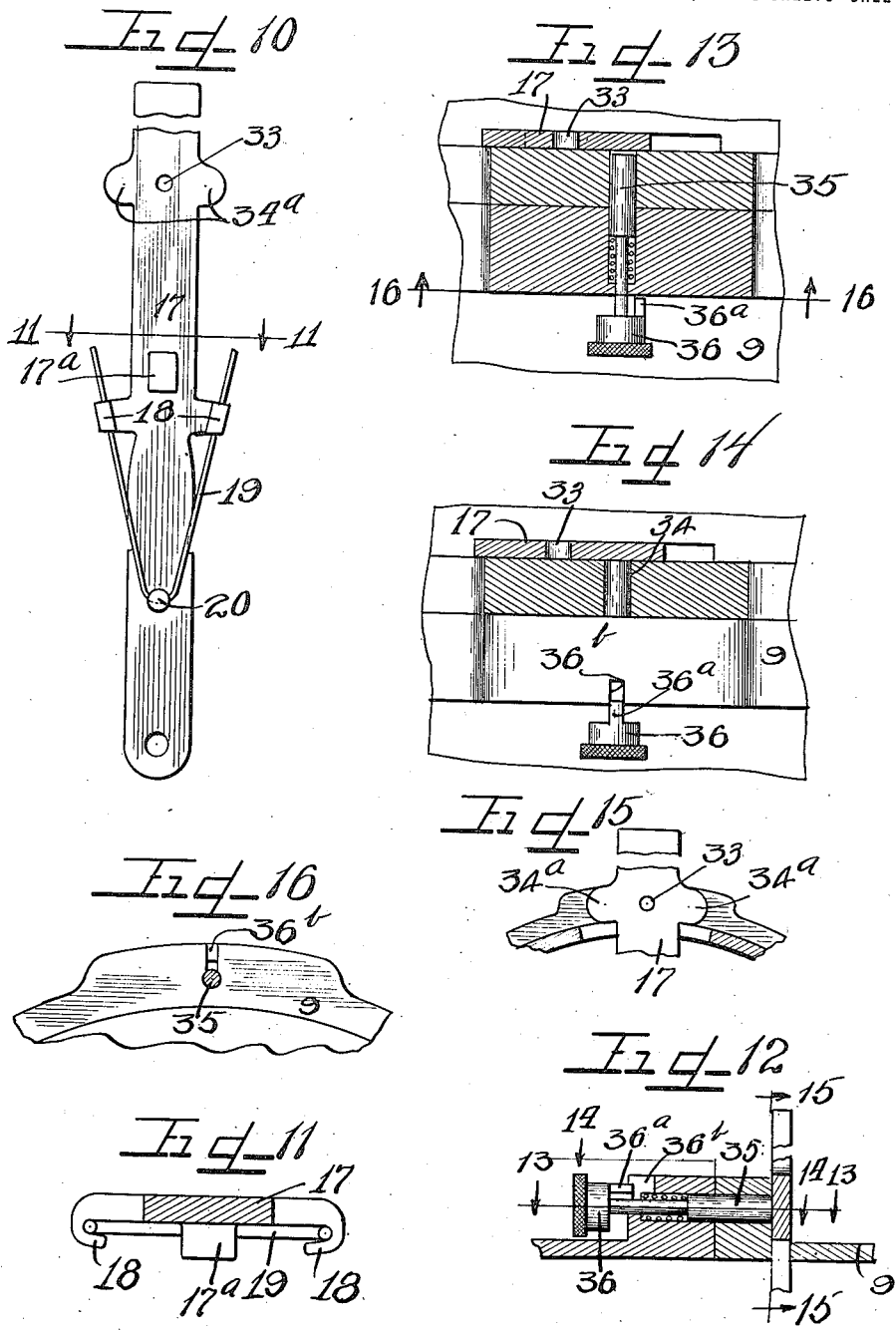

HAROLD W. EDEN, OF CHICAGO, ILLINOIS, ASSIGNOR, BY MESNE ASSIGNMENTS, TO BROKAW-EDEN MANUFACTURING CO., A CORPORATION OF DELAWARE.

CLUTCH-SHIFTING MECHANISM.

1,299,925.          Specification of Letters Patent.      Patented Apr. 8, 1919.

Application filed September 13, 1915. Serial No. 50,307.

*To all whom it may concern:*

Be it known that I, HAROLD W. EDEN, a citizen of the United States, and a resident of the city of Chicago, in the county of Cook and State of Illinois, have invented certain new and useful Improvements in Clutch-Shifting Mechanisms; and I do hereby declare that the following is a full, clear, and exact description of the same, reference being had to the accompanying drawings, and to the numerals of reference marked thereon, which form a part of this specification.

This invention relates to improvements in gearing devices as set forth in my patent for "gearing", No. 1,037,746, issued September 3rd, 1912. This type of mechanism, although well adapted for any purpose, is more particularly designed for use upon a washing machine, and operates to positively throw and maintain the clutch shifting mechanism thereof from one position to another, so as to insure a reversal in the drive of the clothes drum within the tub at periodic intervals.

It is an object, therefore, of this invention to construct a mechanism adapted for use on washing machines acting positively and automatically to reverse the drive to the clothes drum quickly and without lost motion.

It is also an important object of this invention to construct a reversing mechanism wherein gear driven cam mechanisms operate automatically to shift the elements, and with spring mechanism associated therewith to insure a complete movement of said elements to an extreme position after the same have been shifted slightly past dead center by the cam mechanism.

It is also an object of this invention to provide a control for an automatically acting reversing mechanism whereby means act to lock said mechanism in neutral position when set in release position, and with said mechanism so constructed that when unlocked by said means the mechanism moves automatically from neutral position to driving position.

It is furthermore an important object of this invention to construct an automatically acting reversing mechanism having spring mechanism associated therewith which acts to insure a throw of certain elements of said reversing mechanism into an extreme position of movement when the same have been moved slightly beyond dead center position.

It is finally an object of this invention to improve the construction of reversing gear mechanism by combining therewith means for insuring quick and complete movement of the elements into extreme positions of movement.

The invention (in a preferred form) is illustrated in the drawings and hereinafter more fully described.

In the drawings:

Figure 1 is a front view partly broken away of a washing machine equipped with a reversing gear embodying the principles of this invention.

Fig. 2 is a side view thereof.

Fig. 3 is an enlarged view of the reversing mechanism with the cover plate removed.

Fig. 4 is a fragmentary detail section taken on line 4—4 of Fig. 3.

Fig. 5 is a view similar to Fig. 3, on a reduced scale, illustrating the parts in a shifted position.

Fig. 6 is a fragmentary detail section taken on line 6—6 of Fig. 3.

Fig. 7 is a fragmentary interior rear view of a portion of the reversing mechanism taken on line 7—7 of Fig. 4.

Fig. 8 is a side view of the associated bevel gear and cam gear with the former partly broken away and shown in section.

Fig. 9 is an inner face view of the cam gear.

Fig. 10 is an elevational view of the reversing gear lever.

Fig. 11 is a sectional view on line 11—11 of Fig. 10.

Fig. 12 is a sectional view on line 12—12 of Fig. 2.

Fig. 13 is a sectional view on line 13—13 of Fig. 12.

Fig. 14 is a sectional view on line 14—14 of Fig. 12.

Fig. 15 is a sectional view on line 15—15 of Fig. 12.

Fig. 16 is a sectional view on line 16—16 of Fig. 13.

As shown in the drawings:

The washing machine consists of a tub 1, mounted upon a frame 2, with an electric driving motor 3, disposed at one end and at the lower part of said frame. A gear casing 4, is mounted at the lower end of said frame on one side thereof, and contains gears mounted therewithin driven by a shaft 5, from the motor 3. A wringer 6, is mounted at the top on one side of the tub 1, and is connected to be driven by gears mounted within a casing 7, and tubular members 8, are connected between said respective gear casings 4 and 7, and a large gear casing 9, mounted centrally at one side of the machine. A drive shaft 10, extends through said tubular members 8, from the gear casing 4, through the gear casing 9, and into the gear casing 7, a portion of said shaft being clearly shown in Figs. 3, 4, and 5.

A clothes drum 11, cylindrical in shape, is rotatably mounted within the tub 1, and at one side thereof is connected to a stud shaft 12, which projects into and is journaled within the gear casing 9, and has secured on its inner end a large bevel gear 13. Rotatably mounted upon said shaft 10, within said gear casing 9, are a pair of bevel pinions 14 and 15, respectively, each meshing with the large bevel gear 13, at all times. Splined upon the shaft 10 between said pinions 14 and 15, is a double clutch element 16, adapted to be moved into engagement with either one of said pinions, thus causing the same to rotate with said shaft 10, to drive the bevel gear 13.

For the purpose of actuating said slidable clutch member 16, a lever 17, is pivoted at one of its ends within said gear casing 9, the other end thereof projecting outwardly through a slot in the upper side of the casing, and said lever near its middle is cut away and rounded to engage the recessed spool shaped portion of the clutch member 16, thus permitting free rotation of the clutch, but of course acting to move the clutch longitudinally when the lever is swung about its pivot point. Outstanding lugs 18, are provided on each edge of the lever 17, and are flanged over at their ends to receive the extremities 19, of a spring member bearing thereagainst, which is secured at the point 20, on the inner surface of said lever in any suitable manner. The purpose of the resilient member 19, is to receive the impact of the shifting means, which acts to throw said lever 17, from one position to another to entrain either one of the gears 14 or 15, as the case may be. A lug 17ª, is formed on the lever mid-way between the ends of the spring 19, to afford a limiting stop or abutment therefor in the event the same are bent away from the lugs 18, an undue amount.

A pin 21, is slidably mounted in an apertured extension 22, formed on the rear surface of the bevel pinion 13, and is adapted to be projected through and beyond the front surface of said bevel gear to contact one or the other of the resilient members 19, when said gear is rotating, to thereby throw said lever 17, into an opposite position of adjustment. Said pin 21, is normally held retracted, as clearly shown in Fig. 8, by a compression spring 23ª, wound thereabout and contained within said extension 22.

A cam gear 23, having a plurality of notches 24, in its periphery and a plurality of concavities 25, on its surface, is journaled upon a stud shaft 26, secured in an extension also disposed on the rear surface of the gear 13. Said cam gear is so positioned that the outer end of said pin 21, normally rests upon the surface thereof to engage in one of the concavities 25, which are six in number. Formed upon said cam gear 23, intermediate two of said concavities 25, is a V-shaped projection or cam 27. It is apparent that the cam gear 23, revolves as a whole about the shaft 12, as the gear 13, is rotated, and that consequently it is desirable to rotate said cam gear 23, on its stud shaft 26, one station or the distance between adjacent notches for each rotation of the gear 13, so that with every seventh revolution, the V-shaped cam 27, will engage beneath the pin 21, to project the same through the gear 13, and cause a shifting of the clutch lever. Accordingly a fixed pin 28, is secured upon the inner wall of the gear casing 9, near the lower end thereof, and in a position to be engaged in one of the notches 24, of the cam gear as the same is revolved therepast, thus causing said cam gear to rotate a distance equal to the pitch of said notches 24.

In order to insure a positive throw of the actuating lever 17, into an extreme position after the same has started movement, a pivot member 29, is eccentrically mounted on said lever having an aperture extending transversely through the head thereof, and in which is slidably mounted a short rod 30. The upper or outer end of said short rod 30, is rounded and engages in a rounded recess 31, formed on the inner wall of the casing 9, and a spiral compression spring 32, is wound about said slidable rod and is disposed between the rounded head at one end thereof and said pivot member 29. The outer end of said lever 17, is provided with an aperture 33, adapted to register with an aperture 34, in the gear casing 9, when said lever is in a neutral position such as shown in Fig. 3, and on each side of said lever integral wing plate extensions 34ª, are formed, one on each side of the aperture 33. A spring impelled pin 35, is mounted in the aperture 34, of the gear casing, provided with an actuating head 36, and formed on one side thereof is a small finger 36ª, so disposed as to be capable of registration with, and insertion into a slot or keyway 36ᵇ, therefor when the head 36, is rotated for the purpose. Of course when the finger 36ª, is registered with the slot 36ᵇ, the pin 35, is permitted to move inwardly under the impulse of its spring to bear against the lever 17, or the wing plate extensions 34ᵃ, or to project through the aperture 34, in the event the same is moved with said lever 17, into registering position with said pin.

The operation is as follows:

Normally the shifting gear mechanism may be in a neutral position, that is with the lever 17, held from movement by the pin 35, engaged therewith, and when so disposed neither of the bevel pinions 14 or 15, are caused to rotate with the constantly rotating shaft 10, so that no drive is transmitted through the bevel gear 13, to the clothes drum 11. However, said lever 17, projecting as it does through a slot in the walls of the casing 9, is accessible from without and conveniently actuatable after retraction of the pin 35, into either one of its extreme positions, thereby engaging one of the gears 14 or 15, as the case may be, with the shaft 10, to cause rotation of the clothes drum. Due to the eccentric connection of the small sliding rod 30, with said lever 17, the spring 32, coiled about said rod acts normally to throw said lever either to one side or the other to engage the clutch of the reversing mechanism, and said lever is incapable of remaining in a neutral position except when locked therein by the pin 35, or held manually in such position. Said lever 17, may be automatically locked in the neutral position shown in Fig. 3, by rotating the head 36, of the pin 35, so that the finger 36ᵃ, projects a small amount into the slot 36ᵇ, and then when said lever 17, swings from one position toward the other, the pin 35, under the impulse of its spring, will be projected through the aperture 34, of said lever, thus holding said lever from movement.

When it is desired to cause rotation of the clothes drum, the pin 35, is manually retracted and the head 36, thereof rotated an amount sufficient to move the finger 36ᵃ, out of the slot 36ᵇ, so that said finger bearing on the casing holds the pin 35, retracted, and immediately the eccentrically mounted spring 32, acts to thrust said lever 17, to the right, referring to Fig. 3. When the gear 13, has rotated a sufficient number of times to have caused the cam gear 23, to move into a position such that the V-shaped cam 27, on the surface thereof engages beneath the pin 21, said pin 21, is projected through the face of said gear 13, and caused to contact one of the resilient members of the spring 19, mounted on the actuating lever 17, so that said spring is stressed and the lever is thrown against the stress of the spring 32, toward a neutral position, and as it is moved therepast said spring 32, serves to impel the same into its opposite extreme position of movement, thus engaging the other of the respective gears 14 or 15, as the case may be, to the shaft, and causing a reversal in rotation of the clothes drum 11. Of course the lever 17, may be actuated manually from without by an operator at any time by merely shifting the same into a neutral position to cause stoppage of the clothes drum or to cause reversal thereof by throwing the same in its opposite extreme position of movement. As shown, the cam gear 23, is provided with seven notches 24, in its periphery, so that seven contacts with the fixed pin 28, which cause rotation thereof as the same is revolved around with the gear 13, must take place before the V-shaped cam 27, engages beneath the pin 21, to project the same through the face of the gear 13, and thereby cause shifting of the actuating lever 17. However, it is immaterial how many such notches 24, are used, inasmuch as the number depends upon the number of complete revolutions of the clothes drum desired before the same is caused to reverse and rotate in an opposite direction.

I am aware that various details of construction may be varied through a wide range without departing from the principles of this invention, and I therefore do not purpose limiting the patent granted otherwise than necessitated by the prior art.

I claim as my invention:

1. In a device of the class described the combination with a main gear, of idler pinions meshing therewith, a drive shaft on which said pinions are journaled, a clutch adapted to engage one of said pinions to said shaft, pivoted means adapted to shift said clutch to engage one of said pinions to said shaft, mechanism for locking the same in neutral position, and spring actuated mechanisms adapted to impel said pivoted means into an extreme position of movement when the same has been moved slightly beyond dead center position.

2. In a reversing gear, the combination of a rotary member, a pair of drive members therefor, shiftable means for connecting the drive members alternately with the rotary member for operating the latter alternately in opposite directions, means automatically operated to periodically actuate the shiftable means to reverse the operation of the rotary member, and means affording a resilient engagement and a subsequently acting positive engagement between the automatic means and shiftable means for accumulating power, previous to such positive engagement, to throw the shiftable member.

3. The combination with a reversing gear mechanism of a pivotally mounted reversing lever, resilient means eccentrically connected thereto to prevent said lever remaining freely at rest in neutral position, and spring impelled locking means adapted to automatically interlock with said lever to lock the same in neutral position and when released therefrom permitting said lever to swing under the impulse of said resilient means automatically into an extreme position.

4. In a device of the class described the combination with a main bevel gear, of idler bevel pinions meshing therewith, a drive shaft, a clutch adapted to interlock one or the other of said bevel pinions with the drive shaft to drive said main bevel gear, a pivotally mounted lever for moving said clutch, resilient means connected to said lever to prevent the same remaining freely at rest in neutral position and acting normally to impel said lever from neutral position to interlock the clutch with one of said pinions, and means adapted to automatically engage said lever to lock the same in neutral position, and when released therefrom, permitting said lever to swing under the impulse of said resilient means to actuate said clutch into engagement with one of said pinions.

5. In a device of the class described the combination with a reversing gear mechanism, of an actuating lever therefor, means to throw said lever into an extreme position preventing the same coming to rest freely in neutral position, a spring impelled pin adapted to engage said lever to lock the same in neutral position, means for retaining said pin retracted, and mechanism coacting with said latter means to retain the pin in position for engagement with the lever to permit automatic operation thereof into engaging position when said lever swings into neutral position during a reversing movement.

6. In a reversing gear mechanism of the class described a swingingly mounted lever for actuating the parts of said mechanism to effect reversal thereof, a spring impelled rod eccentrically connected to said lever to prevent the same coming freely to rest in neutral position, and a spring impelled pin adapted automatically to engage said lever as it swings to neutral position to lock the same therein, and when withdrawn therefrom, permitting said lever to be swung automatically into an extreme position to effect a reversing movement of the mechanism.

7. In a reversing gear, the combination of a rotary member, a drive member at each side thereof, shiftable means intermediate of the drive members for connecting the drive members alternately with the rotary member for operating the latter alternately in opposite directions, means automatically adjustable to periodically engage the shiftable means and alternate the connection of the drive members with the driven member, locking means for holding the shiftable means in neutral position to interrupt operation of the rotary member, and means operable independently of the automatically adjustable means for restoring the connection of the driving members with the rotary member when the locking means is released.

8. In a reversing gear, the combination of a rotary member, a pair of drive members therefor, shiftable means automatically actuated to engage the drive members so as to operate the rotary member alternately in opposite directions, means adapted to operate after a predetermined movement of the shiftable member from either extremity of its movement to throw said member to the other extremity of its movement, and means provided with locking mechanism controlled by the operator for interrupting the driving connection between the shiftable means and rotary member for controlling the operation of the latter.

9. In a reversing gear, the combination of a rotary member, a pair of drive members therefor, shiftable means automatically actuated to engage the drive members so as to operate the rotary member alternately in opposite directions, means adapted to operate after a predetermined movement of the shiftable member from either extremity of its movement to throw said member to the other extremity of its movement, manually adjustable mechanism for controlling the driving connection between the shiftable member and the rotary member, and locking means for holding the adjustable mechanism in the disengaged position.

10. In a reversing gear, the combination of a rotary member, a pair of drive gears therefor, a clutch, means for automatically actuating the clutch to operate the rotary member alternately in opposite directions, and a device for controlling the operation of the rotary member comprising a spring impelled member, means for manually retracting the spring impelled member against the tension of the spring, and means for locking said member in the retracted position, said member being adapted in one position to interrupt the operation of the rotary member by the driving gears, and in the other position to permit such operation.

11. In a reversing gear, the combination of a rotary member, a pair of drive gears therefor, an oscillating member between the drive gears provided with clutch mechanism for engaging the gears, means mounted on the oscillating member for automatically operating the clutch to rotate said rotary member alternately in opposite directions, and means manually adjustable to engage or disengage the oscillating member to control the operation of the rotary member.

12. In a reversing gear, the combination of a rotary member, a pair of drive gears therefor, a clutch, a pivoted member having automatically operated means thereon for controlling the operation of the clutch so as to operate the rotary member alternately in opposite directions, a casing for said mechanism, and a manually operable plunger mounted on the casing to engage with the pivoted member and control the operation of the rotary member by the gears.

13. In a device of the class described, the combination of a rotary member, a shiftable member, driving means controlled by said shiftable member to automatically operate the rotary member alternately in opposite directions, resilient means actuated as the rotary member nears the limit of its movement in either direction to exert a tension to actuate the shiftable member, and an abutment coöperating with the resilient means to impart a positive movement to the shiftable member to reverse the operation of the rotary member.

14. In a reversing gear, the combination of a rotary member, a shiftable member, driving means controlled by said shiftable member to automatically operate the rotary member alternately in opposite directions, resilient means for throwing the shiftable member to either side of an intermediate position, a stop having resilient means coöperating therewith to throw the shiftable member, as the rotary member nears the limit of its movement in either direction, to reverse the operation of the rotary member, and manually operable means for locking the shiftable member in the neutral position.

15. In a device of the class described, the combination of a rotary member, a pair of drive members, a shiftable member having a clutch automatically operated to engage the drive members so as to actuate the rotary member alternately in opposite directions, means adjustable by the operator to lock the shiftable member so as to hold the clutch in neutral position, and means actuable upon release of the locking means to throw the clutch into engagement with one of the drive members.

16. In a reversing gear, the combination of a rotary member, a pair of driving members therefor, a clutch provided with shifting means automatically actuated to operate the rotary member alternately in opposite directions, resilient means actuable by movement of the shifting means from one extremity of its movement to throw the said shifting means to the other extremity of its movement, and locking means manually adjustable to hold the shifting means and clutch in the inoperative position under a suitable tension of the said resilient means so as to throw the clutch, upon release of the locking means, into operative engagement.

17. In a reversing mechanism, the combination of a rotary member, a pair of driving members therefor, a shiftable member having a clutch adapted to engage the driving members and automatically operable to rotate the said rotary member alternately in opposite directions, means actuated by movement of the shiftable member from one extremity of its movement to throw the shiftable member to the other extremity of its movement, and a locking device manually adjustable to lock the shiftable member in a position to interrupt operation of the rotary member and under a suitable tension to throw said shiftable member to one extremity of its movement when released.

In testimony whereof I have hereunto subscribed my name in the presence of two subscribing witnesses.

HAROLD W. EDEN.

Witnesses:
CHARLES W. HILLS, Jr.,
EARL M. HARDINE.